(12) United States Patent
Ayyanar et al.

(10) Patent No.: US 6,310,785 B1
(45) Date of Patent: Oct. 30, 2001

(54) ZERO VOLTAGE SWITCHING DC-DC CONVERTER

(75) Inventors: Rajapandian Ayyanar, Minneapolis; Ned Mohan, St. Paul, both of MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 09/643,295

(22) Filed: Aug. 22, 2000

Related U.S. Application Data

(60) Provisional application No. 60/151,860, filed on Sep. 1, 1999.

(51) Int. Cl.$^7$ .................................................. H02M 3/335
(52) U.S. Cl. ............................................. 363/17; 363/132
(58) Field of Search .................................. 363/16, 17, 37, 363/97, 98, 131, 132

(56) References Cited

U.S. PATENT DOCUMENTS

| | | | |
|---|---|---|---|
| 4,864,479 | 9/1989 | Steigerwald et al. | 363/17 |
| 5,132,888 | * 7/1992 | Lo et al. | 363/17 |
| 5,157,592 | 10/1992 | Walters | 363/17 |
| 5,198,969 | 3/1993 | Redl et al. | 363/17 |
| 5,291,384 | 3/1994 | Mammano et al. | 363/17 |
| 5,442,540 | 8/1995 | Hua et al. | 363/98 |
| 5,448,467 | * 9/1995 | Ferreira | 363/17 |
| 5,451,962 | * 9/1995 | Steigerwald | 342/175 |
| 5,519,306 | * 5/1996 | Itoh et al. | 323/222 |
| 5,541,827 | 7/1996 | Allfather | 363/17 |
| 5,895,103 | * 2/1999 | Bhagwat et al. | 363/17 |

OTHER PUBLICATIONS

S. Hamada, T. Kanazawa, Y. Ogino and M. Nakaoka, "A New Conceptional PWM DC–DC Converter With Zero Voltage Switching Incorporating Non–Controlled Saturable Reactors", IEE Transactions on Power Electronics Specialist Conference, pp. 881–888, Sep. 1989.

R L Steigerwald, R W DeDoncker and M H Kheraluwala, "A Comparison of High–Power DC–DC Soft–Switched Converter Topologies", IEE Transactions on Industry Applications, vol. 32, No. 5, pp. 1139–1145, Sep.–Oct. 1996.

Javier Sebastian, Pedro J. Villegas, Fernando Nuno and Marta M. Hernando, "High–Efficiency and Wide–Bandwith Perfomance Obtainable from a Two–input Buck Converter", IEE Transactions of Power Electronics, vol. 13, No. 4, pp. 706–717, Jul. 1998.

Bill Andreycak, "Phase Shifted, Zero Voltage Transition Design Considerations and the UC3875 PWM Controller", Application Note, Unitrode, May 1997.

Robert Watson and Fred Lee, "Analysis, Design and Experimental Results of a 1–Kw ZVS–FB–PWM Converter Employing Magamp Secondary–Side Control", IEE Transactions on Industrial Electronics, vol. 45, No. 5, pp. 806–813, Oct. 1998.

* cited by examiner

*Primary Examiner*—Matthew Nguyen
(74) *Attorney, Agent, or Firm*—Westman, Champlin & Kelly, P.A.; S. Koehler

(57) ABSTRACT

A DC-DC power converter includes input terminals and a rectifier circuit. An additional circuit is connected to the input terminals and the rectifier. The latter circuit is adapted to generate a varying voltage at output terminals of the rectifier that varies in amplitude from a maximum voltage value to a non-zero voltage value between the maximum voltage value and zero.

16 Claims, 9 Drawing Sheets

ZERO VOLTAGE SWITCHING DC-DC CONVERTER

CROSS REFERENCE TO RELATED APPLICATION

This application is based on and claims the benefit of U.S. provisional patent application No. 60/151,860, filed Sep. 1, 1999, which is hereby incorporated by reference in its entirety.

This invention was made with government support under ECS-9800130 awarded by the National Science Foundation. The government has certain rights in the invention.

BACKGROUND OF THE INVENTION

The present invention relates to power converters. More particularly, the present invention relates to a DC-DC converter capable of having zero-voltage-switching over the full load range of operation.

A phase-modulated full-bridge converter (PMC) is a common topology used for DC-DC conversion. The PMC circuit typically includes an inductor and capacitor connected in series across the input terminals of the circuit. Four switching elements are connected together to form a left-leg branch and a right-leg branch, wherein each branch comprises two switching elements connected in series across the capacitor. A primary winding of a transformer connects the left-leg branch with the right-leg branch at the series connection of the switching elements of each of the branches. A secondary winding of the transformer is provided to an output circuit comprising a full bridge rectifier and a low-pass filtering circuit.

The main advantage of the PMC circuit is zero-voltage-switching of the switching elements while still operating at a constant switching frequency, which allows a simple control circuit. However, the main disadvantage of the conventional PMC circuit is that the zero-voltage-switching characteristics are load dependent, and achieving zero-voltage-switching below, for example, one-half load causes unacceptable high conduction losses.

From the view point of zero-voltage-switching, the left-leg branch switching elements and the right-leg branch switching elements of the PMC circuit operate under significantly different conditions. During transition of the right-leg branch, the transformer primary current does not change direction and remains in the proper direction to discharge the appropriate switch capacitances in order to achieve zero-voltage turn-on. However, during transition of the left-leg branch, the transformer primary current reduces and eventually changes polarity. Hence, the energy available for charging/discharging the appropriate switch capacitance is less. Therefore, achieving zero-voltage-switching for the left-leg branch switching elements is more difficult. Also, the energy available is a function of the load current and at light loads zero-voltage-switching is lost.

Two techniques have been advanced to increase the zero-voltage-switching load range. A first technique includes adding an external inductor in series with the primary of the transformer. The second technique includes increasing the magnetizing current of the transformer. Nevertheless, both of these techniques result in high conduction losses. Therefore, zero-voltage-switching in the conventional PMC circuit at light loads is obtained only at the expense of increased conduction losses and increased VA ratings of the magnetic components. Accordingly, as a compromise between the switching and conduction losses, the PMC circuit is usually designed to achieve zero-voltage-switching only above a certain load, typically about sixty percent of the full-load. Below this limit, the converter typically operates in a hard-switch mode.

There thus is a continuing need to improve the zero-voltage-switching range of a DC-DC converter.

SUMMARY OF THE INVENTION

A DC-DC power converter includes input terminals and a rectifier circuit. An additional circuit is connected to the input terminals and the rectifier. The latter circuit is adapted to generate a varying voltage at output terminals of the rectifier that varies in amplitude from a maximum voltage value to a non-zero voltage value between the maximum voltage value and zero.

DETAILED DESCRIPTION OF THE ILLUSTRATIVE EMBODIMENTS

Figure 1:
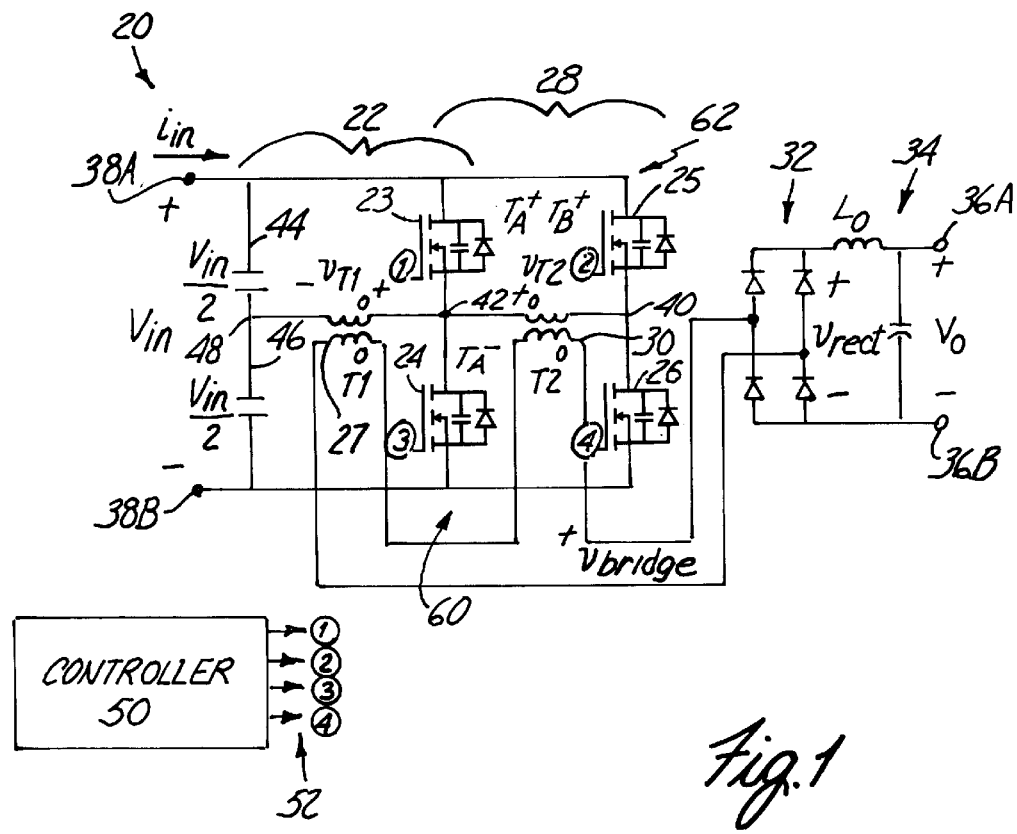
FIG. 1 is a circuit diagram of a first embodiment of a power converter of the present invention.

FIG. 1 illustrates a first embodiment of a converter 20 of the present invention. Generally, the converter 20 includes a half-bridge uncontrolled section 22 comprising switching elements 23 and 24, and a transformer 27, and a full-bridge controlled section 28 comprising switching elements 23, 24, 25 and 26, and a transformer 30. In operation, the half-bridge section 22 and the full-bridge section 28 can be considered two parts of the output power of the converter 20. The half-bridge section 22 processes power at a constant duty ratio, while the full-bridge section 28 is operated by pulse-width-modulation to obtain a regulated output, which is added with the output from the half-bridge section 22 to yield a combined output $V_{bridge}$. In the embodiment illustrated, the combined output $V_{bridge}$ is applied to a rectifier 32 and a filtering circuit 34 (herein illustrated as a low-pass filter) wherein a filtered output DC voltage is obtained across terminals 36A and 36B.

In the exemplary embodiment of FIG. 1, input terminals are provided at 38A and 38B. The switching elements 25 and 26 are connected in series across the input terminals 38A and 38B and form a first node 40. The switching elements 23 and 24 are also connected in series across the input terminals 38A and 38B and form a second node 42. A primary winding of transformer 30 is connected across the first node 40 and the second node 42. A third pair of electrical elements (herein capacitors) 44 and 46 are connected across the input terminals 38A and 38B and form a third node 48. A primary winding of the transformer 27 is connected across the second node 42 and the third node 48. The secondary windings of the transformers 27 and 30 are connected in series to obtain the combined output $V_{bridge}$. The control of the switching elements 23–26 is identical to that of a conventional phase-modulated converter. A controller 50 provides control signals 52 to each of the switching elements 23–26. Each of the four switching elements 23–26 are operated at a fifty percent duty-ratio.

Figure 2:
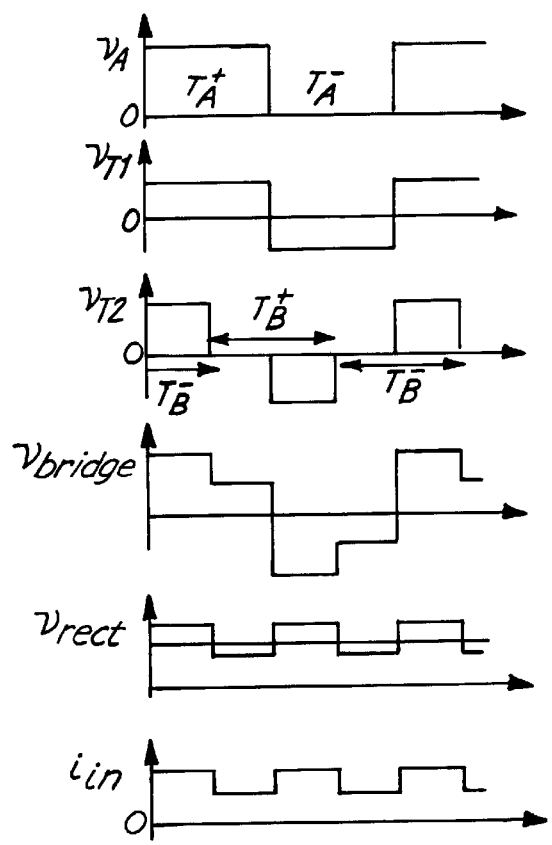
FIG. 2 is a collection of voltage waveforms defined in FIG. 1.

Since switching elements 23 and 24 are operated at a fifty percent duty-ratio, the voltage $(V_{T1})$ across the primary winding of transformer 27 is a pure square wave of amplitude equal to half the input voltage $V_{in}$ as illustrated in FIG. 2. The turns-ratio of transformer 27 (having typically a large air gap) is chosen such that at the maximum input voltage, the voltage on the secondary winding of transformer 27 is equal to the desired output voltage of the converter across output terminals 36A and 36B. In other words, at the maximum input voltage, the entire output of converter 20 is delivered by transformer 27. Under these conditions, the phase-modulated converter section 28 operates with zero-phase difference, and hence, does not contribute any power. As the input voltage drops from the maximum value, the output power delivered by the half-bridge section 22 drops proportionately. The balance of necessary output power is then provided by the full-bridge section 28 by suitably controlling the phase difference between a left branch 60 (switching elements 23 and 24) and a right branch 62 (switching elements 25 and 26). The result in voltage across nodes 40 and 42 is illustrated in FIG. 2 as $v_{T2}$. The transformer 30 is designed (turns ratio and VA rating) such that the full bridge section 28 is able to deliver the balance of power down to the minimum input voltage across terminals 38A and 38B.

For example, the turns-ratio of the transformers 27 and 30 ($n_1$ and $n_2$, respectively) can be selected according to the following equations:

$$\frac{V_{in,max}}{2} \times n_1 = V_o$$

$$\frac{V_{in,min}}{2} \times n_1 + V_{in,min} \times n_2 = V_o$$

The half-bridge section 22 of converter 20 approaches the characteristics of an ideal converter. The half-bridge section 22 draws a steady DC current from the input terminal 38A and delivers a steady DC output voltage at the output terminals 36A and 38B. Since a major portion of the power is processed by the half-bridge section 22, the input current and the voltage at the input of the filtering circuit 34 have much improved waveshapes compared to the conventional topology. As illustrated in FIG. 2, the rectified secondary voltage $V_{rect}$ is oscillatory with amplitude changes from a maximum to a value which is greater than zero and is typically more than one-quarter and frequently more than half the maximum. In a conventional topology, the change in voltage is from a maximum to zero.

It should also be noted that the input current $i_{in}$ of the converter 20 has a similar shape to that of the output voltage from the rectifier 32 as illustrated in FIG. 2. Specifically, the input current $i_{in}$ is oscillatory with amplitude changes from a maximum to a value which is greater than zero and is typically more than one-quarter and frequently more than half the maximum.

It should also be noted that the waveforms provided herein are idealized wherein practical implementations of the converters of the present invention described above and below may generate waveforms that depart slightly from those shown. As used herein, "greater than zero" or "non-zero" allows for transient occurrences to zero, which may be present in practical implementations of the invention; however, these transient occurrences are not relied upon for regulation. In the present invention, regulation is provided between the maximum (substantially steady state) current or voltage and the non-zero (substantially steady state) current or voltage.

A direct consequence of this design is a significant reduction in the size of filter inductors needed to smooth the input and output currents. It has been found by analysis and verified by simulation and experimentation that, for the same ripple current, the size of both an output inductor 39 and an input inductor (not shown in FIG. 1) can be reduced by a factor of more than three, assuming a variation of 1:2 in the input voltage across terminals 38A–38B. The exact reduction in an inductor rating is a function of the range of the input voltage variation.

Figure 3:
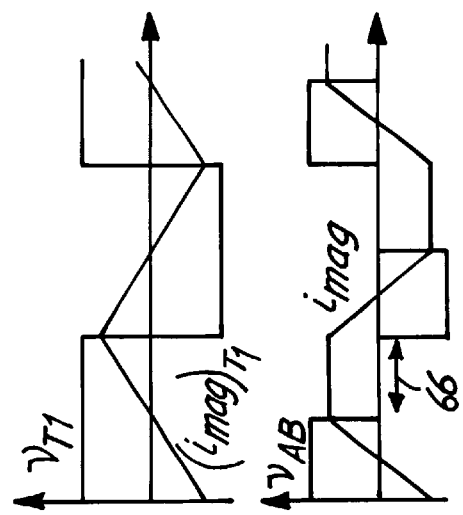
FIG. 3 are waveforms comprising similar currents and voltages of the converter of FIG. 1 with a conventional phase modulated converter.

Soft switching principles in the converter 20 are similar to that of a conventional PMC. However, in converter 20, zero-voltage-switching can be achieved down to no-load without significant increase in conduction losses. Zero-voltage-switching is achieved relying mainly on magnetizing current, $i_{mag}$ of the transformer 27, which is purposely made large. Preferably, no series inductance is added, hence the volt-second lost during an overlap interval is minimum, corresponding to the inherent leakage inductances of the transformers 27 and 30. FIG. 3 compares the magnetizing current, $i_{mag}$ of transformer 27 (upper graph) with that of a conventional PMC (lower graph). In converter 20, increasing $i_{mag}$ does not result in significant conduction loss for the following reasons. Unlike in a conventional PMC, there is no free wheeling interval 66 during which the magnetizing current $i_{mag}$ circulates at its peak value through the switching elements. The contribution of $i_{mag}$ to the total RMS (root-mean-square) current of the switching elements is significantly lower than in a conventional PMC. Furthermore, the magnetizing current $i_{mag}$ does not flow through the right-branch (switching elements 25 and 26) where large magnetizing current is not required. Also, the magnetizing current $i_{mag}$ is proportional to the input voltage, which is desirable since the energy needed for achieving zero-voltage-switching also increases with an increase in input voltage.

Due to the above characteristics, the magnetizing current $i_{mag}$ can be made large, thus achieving zero-voltage-switching even at no-load, without a significant conduction loss penalty. Another important advantage of converter 20 with regard to zero-voltage-switching is that during the critical left-branch transition, the load current does not begin to decrease immediately after the corresponding switch and the left-branch is switched off (which is the case in a conventional PMC). This relationship exists because the voltage across transformer 27 changes polarity only after the mid-point voltage of the left-branch reaches $V_{in}/2$. Therefore, the sum of the secondary voltage across transformers 27 and 30 also does not change polarity immediately after the left-branch switching element is turned-off.

Figure 4:
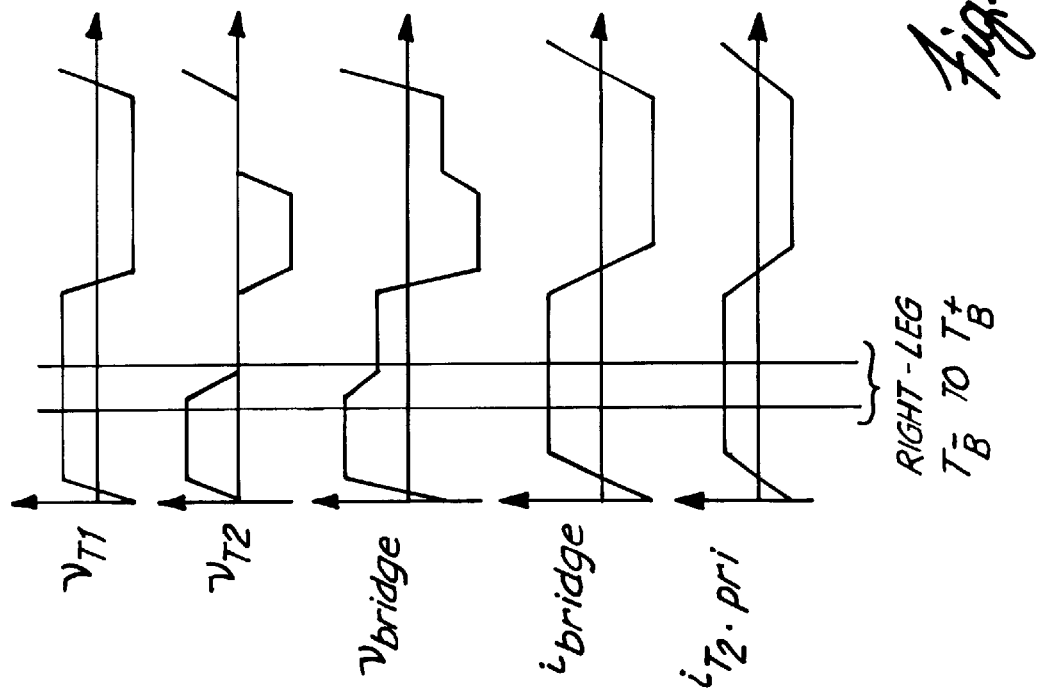
FIG. 4 is a third collection of voltage waveforms defined in FIG. 1.

As with the conventional PMC, the load current aids in zero-voltage-switching for the right-branch switching elements 25 and 26. Zero-voltage-switching for the right-branch switching elements 25 and 26 is achieved typically down to about twenty percent full load. If the load current can drop below this limit, then a small inductor may be connected from node 48 to node 40. The peak current of this inductor needs to be only twenty percent of the peak current flowing through the right-branch switching elements 25 and 26. Since the current through the right-branch switching elements 25 and 26 is low, about ⅓ of that in the left-branch switching elements 23 and 24, the rating of this extra inductor is very low, typically about five percent of the VA rating of converter 20. Its contribution to conduction losses is also negligible. FIG. 4 illustrates waveforms for the right-branch transition.

Figure 5:
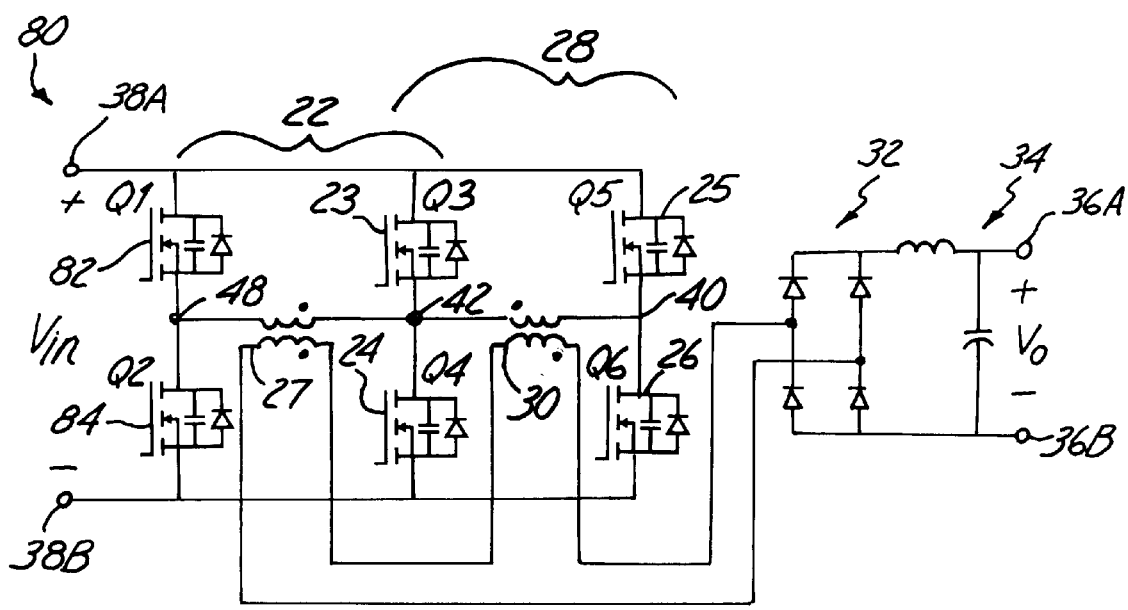
FIG. 5 is a circuit diagram of a second embodiment of a converter of the present invention.

FIG. 5 illustrates a converter 80 suitable for high power applications. Many elements present in the converter 20 described above are also present in the converter 80 and have been similarly identified. In this embodiment, two additional switching elements 82 and 84 are connected in series across the input terminals 38A and 38B to form the node 48. Accordingly, the half-bridge section 22 now comprises a full-bridge section, which operates at full pulse-width. An advantage of this embodiment is that the ripple current rating of an input filter capacitor (not shown) is significantly less than that of a conventional full-bridge converter as well as the converter 20 illustrated in FIG. 1.

In operation, the soft-switching mechanism of the switching elements is identical to converter 20 discussed above. However, during abnormal conditions like start up, overload/short circuit etc., when the output voltage needs to be lower than the normal design values, the pulse-width of the output from the normally uncontrolled section 22 also needs to be reduced. Under these conditions, zero-voltage-switching is lost in converter 20, whereas for the converter 80, the phase-shift of the normally uncontrolled full-bridge 22 can be controlled, while still operating all of the switching elements at fifty percent duty-ratio and hence retaining zero-voltage-switching.

In addition, the converter 80 can be operated such that the normally uncontrolled full-bridge section 22 is operated in the phase-shift controlled mode during high input voltages (above the geometric mean of minimum and maximum) while still limiting the maximum ripple to the specified values. With this arrangement, ratings of the inductors (input and output) as well as the ratings of the transformers 27 and 30 can be further reduced.

Figure 6:
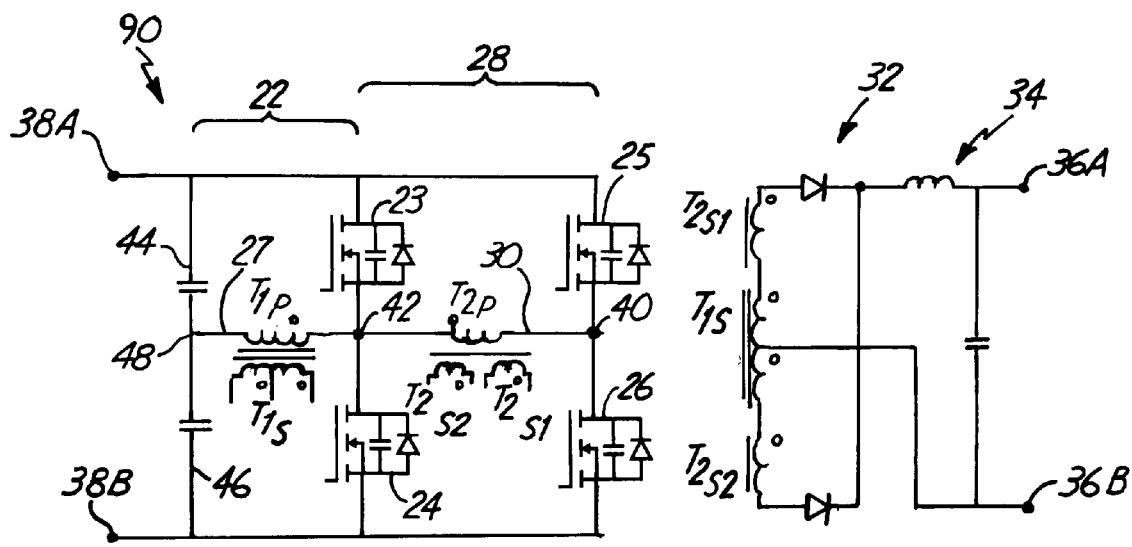
FIG. 6 is a circuit diagram of a third embodiment of a converter of the present invention.

FIG. 6 illustrates a converter 90 suitable for low-output voltage applications. The principal of operation and the soft-switching characteristics are identical to the converter 20 illustrated in FIG. 1 and similar elements have been identified with the same reference numbers. Generally, the secondary winding of one of the transformers 27 and 30 (herein transformer 27) is centered-tapped and the secondary winding of the other transformer (herein transformer 30) has two isolated secondary windings, which are added to the appropriate tapping of the transformer 27. It should be noted that other configurations suitable for low output voltage applications like a synchronous rectifier and a current-doubler circuit, are also applicable and can be incorporated if desired.

Figure 7:
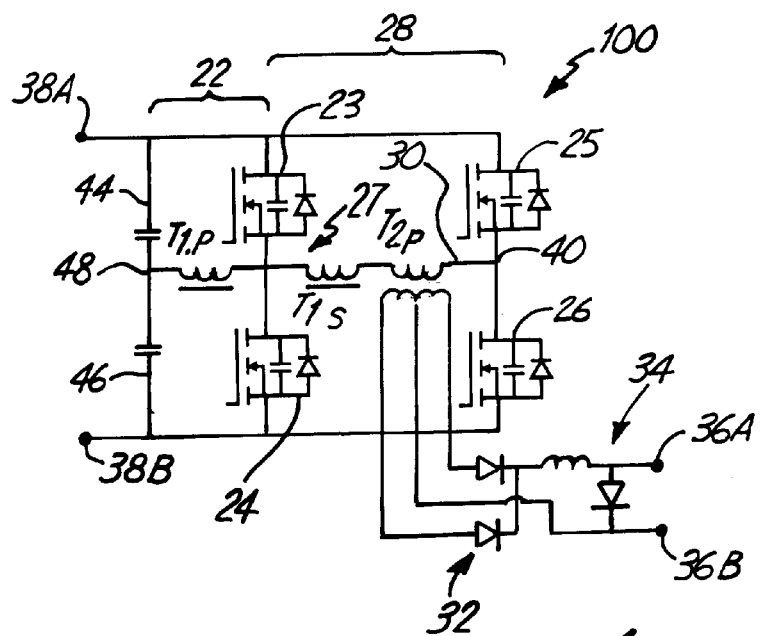
FIG. 7 is a circuit diagram of a fourth embodiment of a converter of the present invention.

FIG. 7 illustrates a converter 100 suitable for applications requiring multiple outputs. In the embodiment illustrated in FIG. 7, the output (secondary winding of transformer 27) of the uncontrolled section 22 is added in series with the primary winding of the controlled section 28. The principal operation and the soft-switching characteristics are identical to the converter illustrated in FIG. 1. In the embodiment of FIG. 1, the secondary windings of transformers 27 and 30 need to be connected in series for each output. In contrast, each output for the converter 100 needs just one centered-tapped winding at the secondary of transformer 30, since the addition of the controlled and uncontrolled sections is accomplished on the primary side of transformer 30. A disadvantage of the embodiment of FIG. 7 is that there is an increase in the transformer rating as compared to the converter 20 of FIG. 1.

Figure 8:
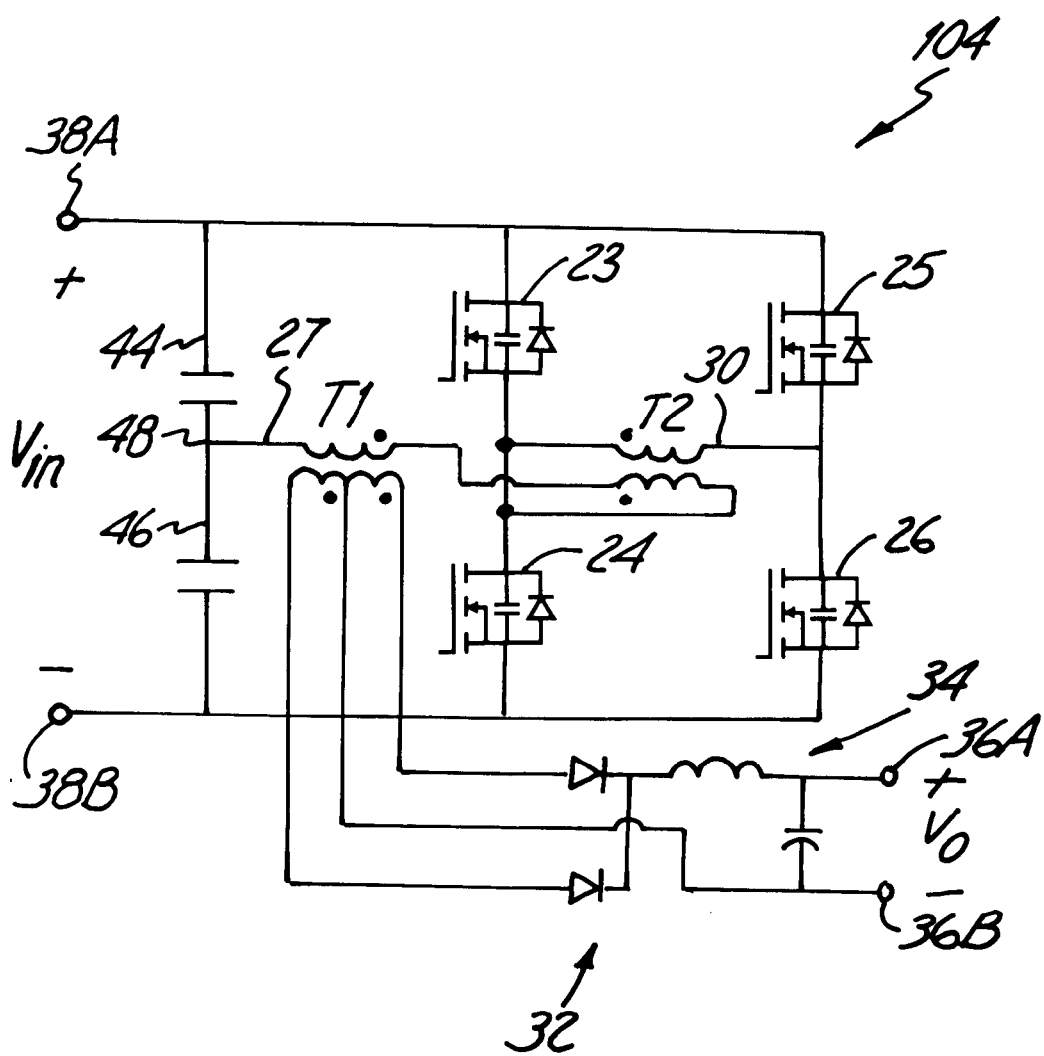
FIG. 8 is a circuit diagram of a fifth embodiment of a converter of the present invention.

It should also be noted that the output of the controlled section (full-bridge) 28 at the secondary windings of the transformer 30 can be connected to the primary winding of the transformer 27 of the uncontrolled section (half-bridge). This embodiment is illustrated in a converter 104 of FIG. 8. The transformer ratings of this embodiment are less than the previous embodiment, while a reduction in filter ratings remains the same. However, the soft-switching characteristics of this embodiment are very different. In particular, achieving zero-voltage-switching for the right-branch switching elements in this variation is more difficult than compared to converter 20 of FIG. 1.

Figure 9:
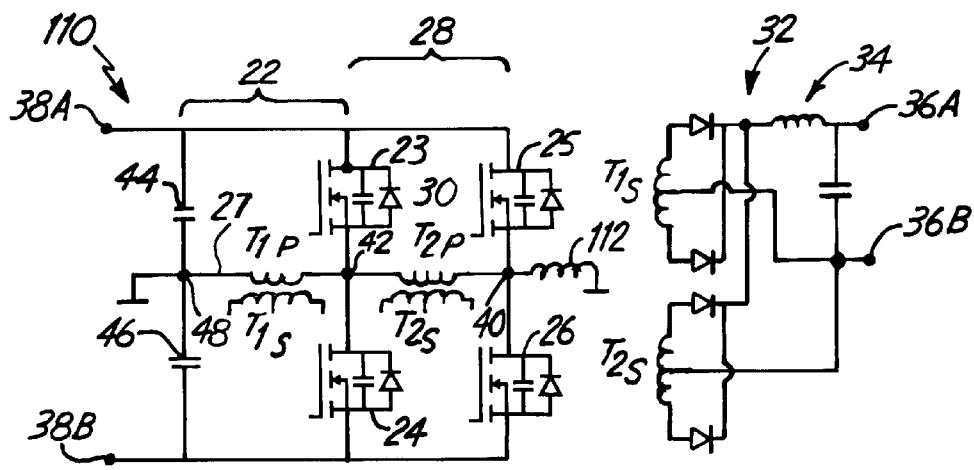
FIG. 9 is a circuit diagram of a sixth embodiment of a converter of the present invention.

FIG. 9 illustrates a further embodiment of a converter 110 of the present invention. In this embodiment, switching elements 23 through 26, transformers 27 and 30, and capacitors 44 and 46 are connected in a manner similar to converter 20 of FIG. 1. However, instead of a series connection of the secondary windings of the transformers 27 and 30, the secondary windings are connected in parallel. The waveforms, both at the input and the output sections can be identical to those of the converter 20 of FIG. 1 if the turns ratio of the transformers are selected accordingly.

In the embodiment illustrated, the secondary voltage of the controlled section 28 (full-bridge in this case) is designed to be more than that of the uncontrolled section 22 (half-bridge section). For example, for a 1:2 variation in the input voltage, the secondary voltage of the controlled section 28 will be twice that of the uncontrolled section 22. Accordingly, at the minimum input voltage across terminals 38A and 38B, the controlled section 28 would operate at full-pulse-width, and hence, will share the entire load at the output terminals 36A and 36B. In contrast, at the maximum input voltage across the input terminals 38A and 38B, the controlled section 28 will operate at zero pulse-width and will not contribute to the output power at the terminals 36A and 36B. Like in the embodiment of FIG. 1, all the switching elements 23–26 are operated at a fifty percent duty-ratio and control of the full-bridge section 28 is by phase-shift modulation. The combined as well as individual VA rating of each of the switching elements is identical to that of the conventional full-bridge converter. However, since there are four diodes the combined rating of the diodes is more. But since at any time only one diode is conducting, the diode losses are the same as other converters, and considering that the voltage rating of the diodes of the uncontrolled section 22 is lower than those of the conventional converter, the diode losses can actually be less.

A significant advantage of the converter 110 of FIG. 9 is that during freewheeling, the load current does not circulate through the right-branch switching elements 25 and 26 and transformer 30, hence reducing the conduction losses. Also, the peak magnetizing current required to achieve zero-voltage-switching for the left-branch switching elements is less compared to converter 20 of FIG. 1, since the load current component is less and the magnetizing current is designed to be about fifty percent to seventy percent of the load current. As discussed above with respect to converter 20, to achieve zero-voltage-switching for the right-branch switching elements at very light loads, another inductor 112 between nodes 48 and 40 may need to be connected. A magnetizing current of the inductor 112 needs to be only very small and its contribution to the conduction losses is negligible.

Figure 10:
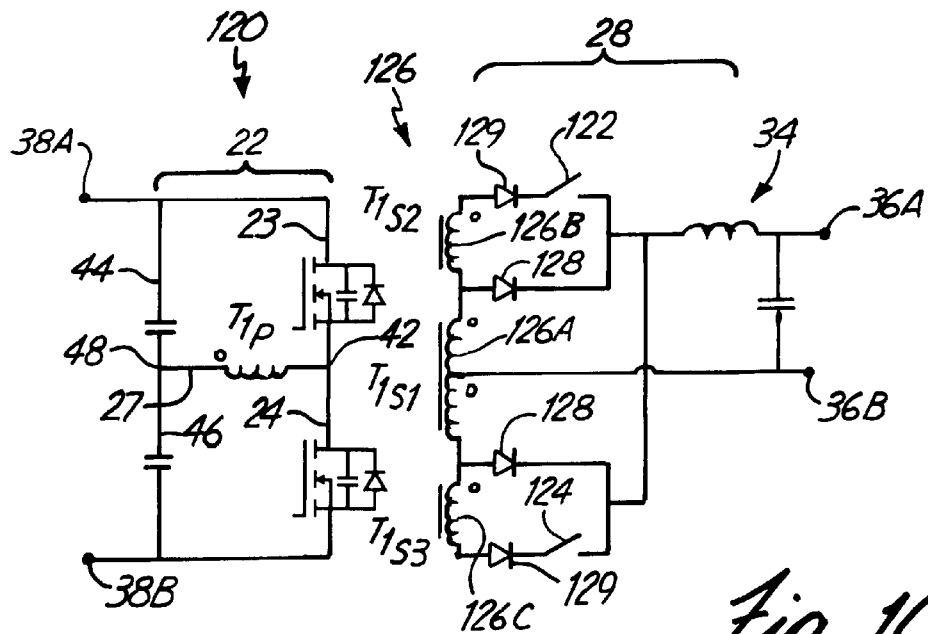
FIG. 10 is a circuit diagram of a seventh embodiment of a converter of the present invention.

FIG. 10 illustrates a converter 120 that is well suited for applications where the input voltage across terminals 38A and 38B is very constant and the output voltage across terminals 36A and 36B needs to be regulated over a range that can vary widely. For instance, this condition is present in battery chargers with front-end power factor control. As in the previous embodiments, an uncontrolled section 22 (herein a half-bridge section similar to converter 20 of FIG. 1, but which also could be a full-bridge section similar to converter 80 of FIG. 5) is connected across the input terminals 38A and 38B. Control of the converter 120 is achieved by varying the phase shift of the secondary side switching elements 122 and 124 with respect to the primary side switching elements 23 and 24, wherein the duty-ratio of all switching elements is fifty percent. In this embodiment, transformer 27 includes multiple secondary windings indicated at 126. A turns-ratio for the secondary winding are designed similar to converter 20 of FIG. 1. In particular, the secondary windings 126 include a multiple tapped secondary winding comprising center winding 126A and two smaller secondary windings 126B and 126C. The center winding 126A is connected to the filter stage 34 directly through diodes 128, while the outer windings 126B and 126C are connected to the filter stage 34 through diodes 129 and switching elements 122 and 124.

When the load current flows through the inner secondary winding, the reflected primary current is lower. Hence, the total conduction loss is low compared to a primary side controlled PMC, where during the freewheeling interval the circulating primary current is still at the peak value. The soft-switching characteristics of this embodiment are superior to the converter 20 of FIG. 1, since the primary reflected load current begins to reduce only after the midpoint voltage of switching elements 23 and 24 reaches $V_{in}/2$. Also, when a full-bridge is used in the uncontrolled section 22, there is no difference between the zero-voltage-switching characteristics of the right-branch and left-branch switches. In particular, there is no need for the additional inductor described above with respect to the previous embodiments, which is needed for zero-voltage-switching of the right-branch switching elements at very light loads. The secondary side switching elements 122 and 124 can be designed to operate with zero-current-switching, relying on the leakage inductance of the transformer 27.

Figure 11:
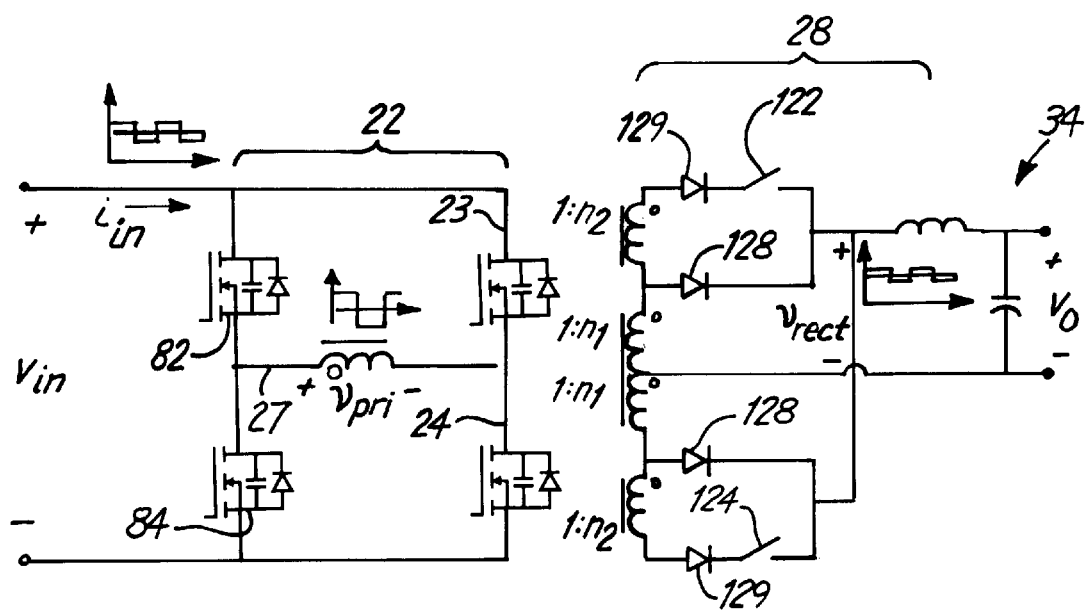
FIG. 11 is a circuit diagram of a eighth embodiment of a converter of the present invention.

FIG. 11 illustrates use of a full-bridge comprising switching elements 23, 24, 82 and 84, which operates uncontrolled (full-pulse-width) at all times.

Figure 12:
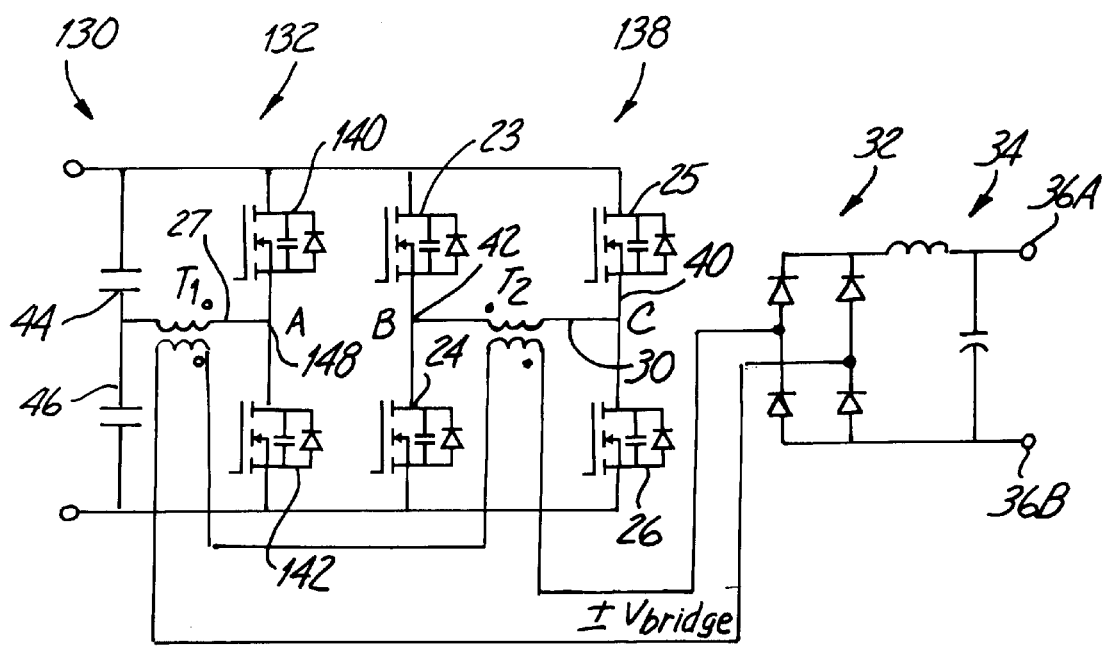
FIG. 12 is a circuit diagram of a ninth embodiment of a converter of the present invention.

In the embodiments discussed above, the output of the controlled section 28 can be either added to or subtracted from the output of the uncontrolled section 22, but not both. FIG. 12 illustrates a converter 130 comprising to independent converter sections 132 and 138. The converter 130 is operable so as to add or subtract the outputs of the two converter sections 132 and 138, depending on the input voltage at terminals 38A and 38B and the desired output voltage at terminals 36A and 36B. With this arrangement, significant improvement in the filter waveforms can be achieved.

Converter section 138 is similar to converter section 28 of the previous embodiments and comprises switching elements 23–26 and transformer 30 forming nodes 40 and 42. Converter section 132 comprises switching elements 140 and 142, capacitors 44 and 46 and transformer 27 with a series connection of switching elements 140 and 142 across input terminals 38A and 38B form a node 148. Each of the switching elements 23–26, 140 and 142 are operated with a preferable, fixed duty-ratio of fifty percent. The phase of the branches of node 42 and node 40 are controlled with respect to the phase of the branch for of node 148 to achieve output control. As discussed above, converter 130 can either add or subtract the outputs converter sections 132 and 138. In order to add the outputs together, the branch of node 42 is synchronized with the branch of node 148 and the phase of the branch of node 40 is modulated to control the output $V_{bridge}$. In other words, the output of the full-bridge converter section 138 is added to the output of the uncontrolled half-bridge converter section 132. When it is desired to subtract the outputs of the converter sections, the branch of node 148 and the branch of node 40 are synchronized and the phase of the branch of node 42 with respect to node 148 is modulated. In this mode, the output of the full-bridge converter section 138 is effectively subtracted from the output of the half-bridge converter section 132.

The turns-ratio of the transformers 27 and 30 ($n_1$ and $n_2$, respectively) can be selected according to the following equations:

$$V_{in,\min} \times \left[\frac{n_1}{2} + n_2\right] = V_0$$

$$V_{in,\max} \times \left[\frac{n_1}{2} - n_2\right] = V_0$$

By using known switching sequences, the soft-switching characteristics of this embodiment can be made similar to the converter 20 of FIG. 1 during both the "add" mode and the "subtract" mode. Like the previous embodiments, the zero-voltage-switching is relied on by the magnetizing current of the uncontrolled transformer.

Figure 13:
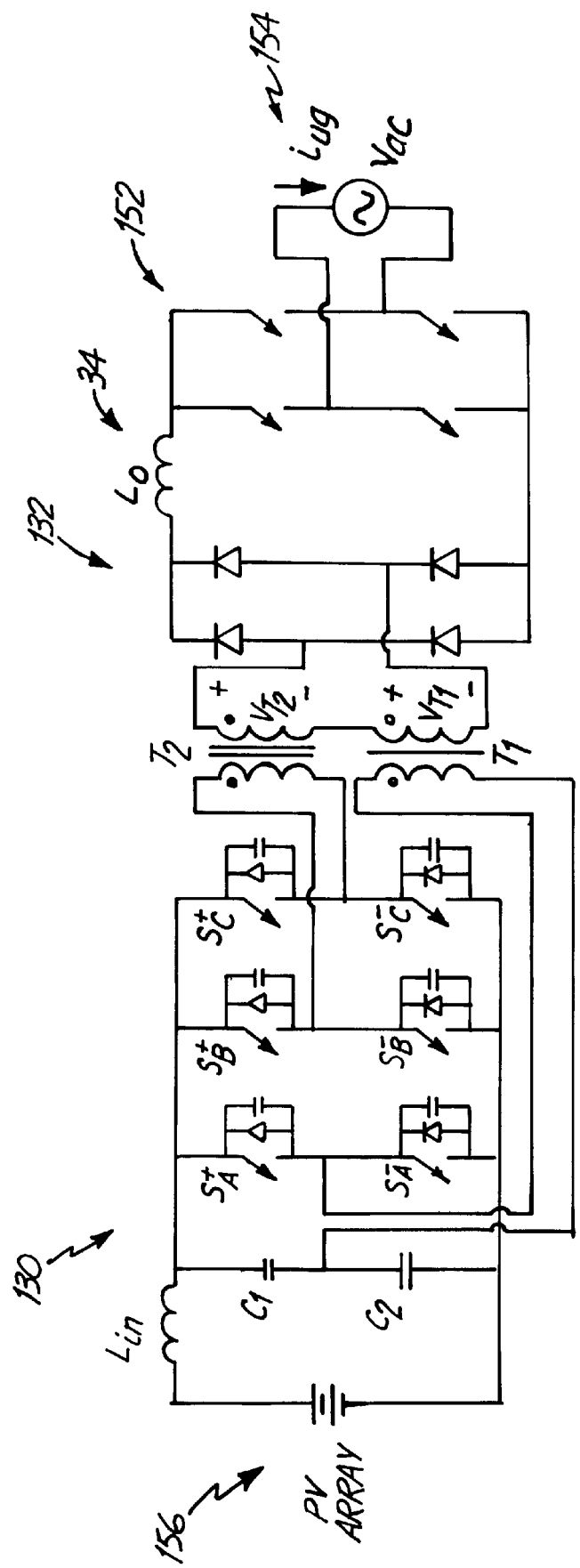
FIG. 13 is a circuit diagram of a utility interface including an embodiment of a converter of the present invention.

The converter of FIG. 12 can be used in interfacing energy sources like photovoltaic sources to a utility grid. FIG. 13 illustrates an interface 150 comprising converter 130 wherein the filter 34 comprises an inductive filter. The current through the inductor is controlled to be a rectified sinusoid. The interface 150 further includes a line-frequency inverter 152 that receives the output from the converter 130 to generate an alternating current output suitable for application to the utility grid represented at 154. In the illustrated embodiment, energy is generated by a photovoltaic source 156 although other sources can be used as appreciated by those skilled in the art. Since the load current as seen by the high frequency converter 130 varies from peak value to zero at the line frequency, the full-load-range zero-voltage-switching characteristics of converter 130 can be a significant advantage.

Although the present has been described with reference to preferred embodiments, workers skilled in the art will recognize that changes may be made in form of detail without departing from the spirit and scope of the invention.

What is claimed is:

1. A power converter comprising:
    a first pair of switching elements connected across a first input terminal and a second input terminal forming a first node;
    a second pair of switching elements connected across the first input terminal and the second input terminal forming a second node;

a first transformer having a primary winding connected across the first and second nodes, and a secondary winding;

a third pair of electrical elements connected across the first input terminal and the second input terminal forming a third node;

a second transformer having a primary winding connected across the second and third nodes, and a secondary winding;

a rectifier connected to the secondary windings of the first and second transformers; and a filter connected to the rectifier having output terminals.

2. The power converter of claim 1 wherein the third pair of electrical elements comprise capacitors.

3. The power converter of claim 1 wherein the third pair of electrical elements comprise switching elements.

4. The power converter of claim 1 and further comprising an inductor connected across the first and third nodes.

5. The power converter of claim 1 wherein the secondary windings are connected in series.

6. A power converter comprising:

a first pair of switching elements connected across a first input terminal and a second input terminal forming a first node;

a second pair of switching elements connected across the first input terminal and the second input terminal forming a second node;

a first transformer having a primary winding connected across the first and second nodes, and a secondary winding with a first end connected to the second node;

a third pair of electrical elements connected across the first input terminal and the second input terminal forming a third node;

a second transformer having a primary winding with a first end connected to the third node and a second end connected to a second end of the secondary winding of the first transformer, the second transformer having a secondary winding;

a rectifier connected to the secondary winding of the second transformer; and a filter connected to the rectifier having output terminals.

7. The power converter of claim 6 wherein the second transformer includes a plurality of secondary windings connected to the rectifier.

8. The power converter of claim 7 wherein the rectifier comprises a half-bridge rectifier.

9. The power converter of claim 8 wherein the plurality of secondary windings of the second transformer form a center-tapped secondary winding.

10. A power converter comprising:

a first pair of switching elements connected across a first input terminal and a second input terminal forming a first node;

a second pair of switching elements connected across the first input terminal and the second input terminal forming a second node;

a first transformer having a primary winding connected across the first and second nodes, and a secondary winding;

a third pair of switching elements connected across the first input terminal and the second input terminal forming a third node;

a fourth pair of electrical elements connected across the first input terminal and the second input terminal forming a fourth node;

a second transformer having a primary winding connected across the third and fourth nodes, and a secondary winding;

a rectifier connected to the secondary windings of the first and second transformers; and a filter connected to the rectifier having output terminals.

11. The power converter of claim 10 wherein the fourth pair of electrical elements comprise capacitors.

12. The power converter of claim 10 wherein the secondary windings are connected in series.

13. A power converter comprising:

a full-bridge converter section comprising:

a first pair of switching elements connected across a first input terminal and a second input terminal forming a first node;

a second pair of switching elements connected across the first input terminal and the second input terminal forming a second node;

a third pair of electrical elements connected across the first input terminal and the second input terminal forming a third node, wherein the second pair of switching elements and the third pair of electrical elements form an uncontrolled second bridge converter section having a square wave output;

a rectifier connected to receive output signals from the full-bridge converter section and the second converter section;

a filter connected to receive output signals from the rectifier and having output terminals; and a controller providing control signals to adjust a phase difference between signals at the first and second nodes.

14. The power converter of claim 13 wherein each of the switching elements are operated at a 50 percent duty-ratio.

15. The power converter of claim 13 wherein the third pair of electrical elements comprise capacitors.

16. The power converter of claim 13 wherein the third pair of electrical elements comprise switching elements.

* * * * *